(12) United States Patent
Laren et al.

(10) Patent No.: US 6,651,343 B2
(45) Date of Patent: Nov. 25, 2003

(54) CLIPPINGS CATCHER ATTACHMENT FOR COMBINED TRIMMER AND VACUUM APPARATUS

(76) Inventors: Charles Laren, 388 N. Main St., Attleboro, MA (US) 02703; Brian Vangel, P.O. Box 1121, Easton, MA (US) 02334

( * ) Notice: Subject to any disclaimer, the term of this patent is extended or adjusted under 35 U.S.C. 154(b) by 0 days.

(21) Appl. No.: 10/044,251

(22) Filed: Jan. 14, 2002

(65) Prior Publication Data

US 2003/0131477 A1 Jul. 17, 2003

(51) Int. Cl.[7] ............................................... B26B 19/38
(52) U.S. Cl. ............................ 30/133; 30/124; 30/216
(58) Field of Search ....................... 30/124, 125, 133, 30/210, 216

(56) References Cited

U.S. PATENT DOCUMENTS

| | | | |
|---|---|---|---|
| 1,528,430 A | * | 3/1925 | Josten et al. .................. 30/133 |
| 4,071,951 A | | 2/1978 | Burns |
| 4,964,472 A | | 10/1990 | Cleworth |
| 4,974,321 A | * | 12/1990 | Yoshida ........................ 30/133 |
| 5,588,289 A | * | 12/1996 | Wilson ......................... 56/13.1 |
| 5,659,958 A | | 8/1997 | Goings |
| 5,862,595 A | | 1/1999 | Keane |
| 6,105,253 A | * | 8/2000 | Kolbert ........................ 30/124 |

\* cited by examiner

*Primary Examiner*—Hwei-Siu Payer

(57) ABSTRACT

A clippings catcher for connection to a powered hedge trimmer to catch trimmings severed from a plant, such as a hedge or bush, by the hedge trimmer. An elongated tubular housing parallel to and extending the length of the hedge trimmer blade assembly defines an air passage to deliver the trimmer cuttings to a powered vacuum collection container. The catcher assembly is easily connected between commercially available powered hedge trimmers and vacuum apparatuses.

13 Claims, 2 Drawing Sheets

US 6,651,343 B2

CLIPPINGS CATCHER ATTACHMENT FOR COMBINED TRIMMER AND VACUUM APPARATUS

BACKGROUND OF THE INVENTION

1. Field of the Invention

The present invention relates generally to portable, hand-holdable trimmer devices for lawn and garden use, and more particularly to a clippings catcher assembly that easily connects and interfaces a powered hedge trimmer to a vacuum apparatus.

2. Description of the Prior Art

Portable hand-holdable hedge trimmers are known which generally comprise electrically powered blade pairs which are relatively moveable, elongated members each having a plurality of tooth-type, double edged cutting blades. When using such hedge trimmers the cuttings are left to fall onto the hedge being trimmed. This necessitates a laborious effort to gather or otherwise dispose of the cuttings using a separate sweeper, vacuum or blower apparatus. It would be extremely advantageous if a hedge trimmer incorporated means for sucking up the grass cuttings immediately after they are produced by the cutting blades and for storing the cuttings in a container carried with the trimmer thereby eliminating the extra step of gathering dispersed cuttings. Such an improved apparatus is provided by the present invention.

SUMMARY OF THE INVENTION

To achieve the foregoing and other advantages, the present invention, briefly described, provides a clippings catcher for connection to a powered hedge trimmer to catch trimmings severed from a plant, such as a hedge or bush, by the hedge trimmer. An elongated tubular housing parallel to and extending the length of the hedge trimmer blade assembly defines an air passage to deliver the trimmer cuttings to a powered vacuum collection container. The catcher assembly is easily connected between commercially available powered hedge trimmers and vacuum apparatuses.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining the preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the purposes of the present invention. It is important, therefore, that the claims be regarded as including such equivalent constructions insofar as they do not depart from the spirit and scope of the present invention.

It is therefore an object of the present invention to provide a new and improved clippings catcher that is easily connected between commercially available powered hedge trimmers and vacuum apparatuses.

It is therefore another object of the present invention to provide a new and improved combined hedge trimmer and vacuum apparatus, which has all of the advantages of the prior art and none of the disadvantages.

It is another object of the present invention to provide a new and improved clipping catcher, which may be easily and efficiently manufactured and marketed.

It is a further object of the present invention to provide a new and improved clippings catcher that is easily interfaced to commercially available hedge trimmers and vacuum apparatuses.

It is still a further object of the present invention to provide a new and improved combined hedge trimmer and vacuum apparatus which combines the dual functions of trimming and substantially simultaneously collecting the trimmer cuttings and transferring them to a collection container associated with the apparatus.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DESCRIPTION OF PREFERRED EMBODIMENT

Figure 1:
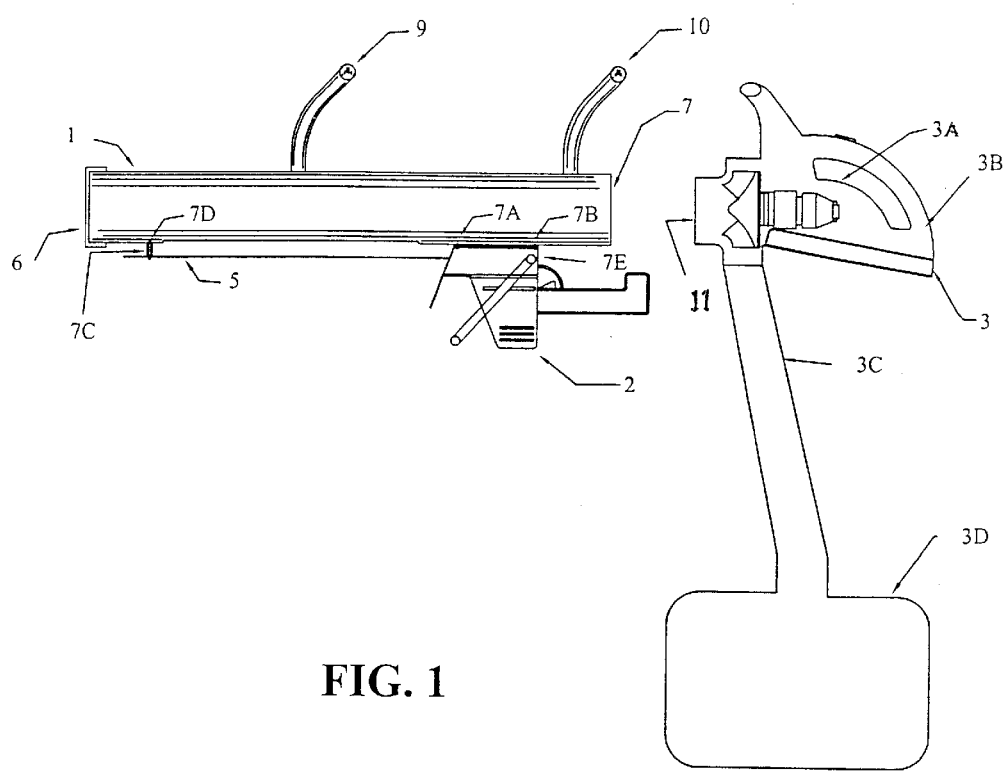
FIG. 1 is a side view of the clippings catcher of this invention as attached to a hedge trimmer and vacuum apparatus.
Figure 2:
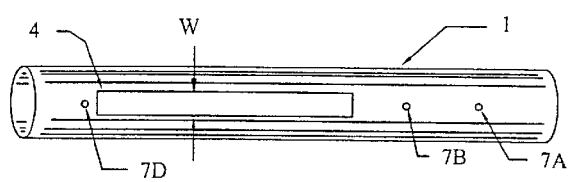
FIG. 2 is a bottom view of the clippings catcher illustrating the tubular construction with longitudinal opening therein.
Figure 3:
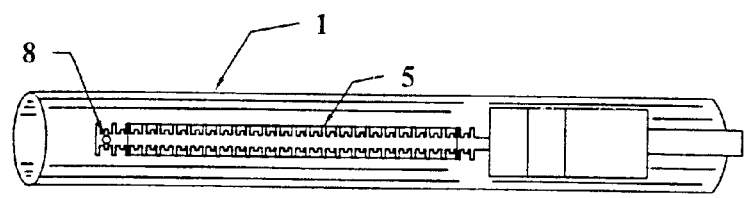
FIG. 3 is a bottom view of the clippings catcher illustrating the placement of hedge trimmer cutting blades over the clippings catcher longitudinal opening.
Figure 4:
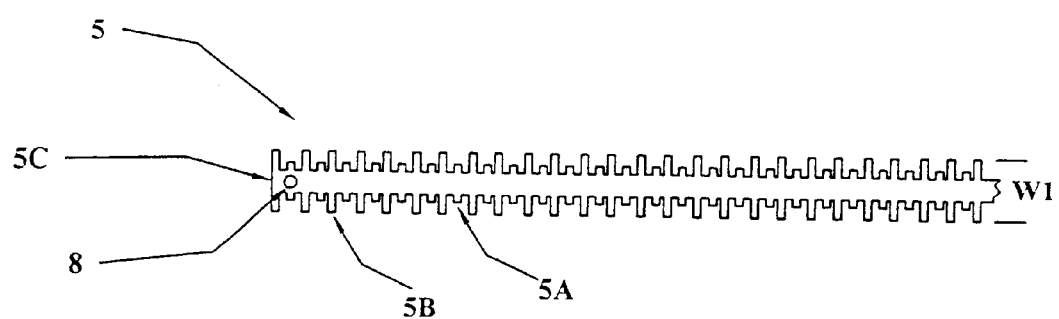
FIG. 4 is a top view of a hedge trimmer elongated blade assembly.

FIG. 1 illustrates clippings catcher 1 according to the preferred embodiment of subject invention, and shows a combined trimmer and vacuum apparatus utilizing clippings catcher 1 as an inlet for collection of hedge trimmings. More specifically, clippings catcher 1 provides an interface between a commercially available hedge trimmer 2 and a commercially available vacuum apparatus 3. As illustrated in FIG. 2, clippings catcher 1 is in the shape of an elongated tube with a longitudinal opening 4 cut down the center thereof. The opening 4 is located above and extends the length of elongated blade assembly 5 and defines a passageway for trimmer clippings. Clippings catcher 1 is sealed at a first end 6 and open at a second end 7. The diameter of opening 7 is any diameter that will permit the mating engagement of clippings catcher 1 with vacuum apparatus 3. The base 7E of hedge trimmer 2 is secured to clippings catcher 1 at points 7A and 7B by screw or bracket means. However, rivets or other conventional fastening means may be used. A spacer 7C is provided at point 7D to separate clippings catcher 1 from blade 5. As illustrated in FIG. 3, screw or bolt means are inserted through the center of the distal end of blade 5, at a point 8, securing blade 5 to clippings catcher 1. If desired, the screw or bolt means may be located internal to spacer 7C. Extending outwardly from base 7E of hedge trimmer 2, is an elongated blade assembly 5. As illustrated in FIG. 4, blade assembly 5 includes moving blades 5A and stationary blades 5B. The lengths of blades 5B are longer than blades 5A to provide gaps into which stalks of vegetation can pass to be cut as the hedge trimmer is moved into the vegetation when the trimmer is in operation. Blades 5A and 5B extend laterally outward from each side edge of rectangular support member 5C. As illustrated in FIG. 2, width w, of longitudinal opening 4 is approximately the same width as width w1 illustrated in FIG. 4. Width w1, is the distance between the ends of blades 5B located on opposite sides of rectangular support member 5C. Handles 9 and 10 are secured to clippings catcher 1 by screws or other conventional fastening means and provide for easy operation of the combined trimmer/vacuum apparatus. In normal operation both the blower and trimmer are electrically connected to the same switch allowing for simultaneous operation upon actuation of electric power. One form of electric hedge trimmer 2 is illustrated and described in U.S. Pat. No. 3,212,188, to Riley et al and another described in U.S. Pat. No. 3,699,655 to Taylor et al.

These disclosures are hereby incorporated herein by reference, to the same extent as if fully re-written. One form of a vacuum apparatus is illustrated in U.S. Pat. No. 5,604,954 to Webster et al and is hereby incorporated by reference, to the same extent as if fully re-written. As illustrated in FIG. 1, vacuum apparatus 3 has a housing 3A with a motor located therein. The housing comprises a handle 3B. The user carries and operates the combined trimmer and vacuum apparatus by utilizing handles 3B, 9 and 10. When the vacuum device is activated air is drawn through inlet 11, thereby sucking debris through air outlet 3C into collection bag 3D. When the combined trimmer/vacuum apparatus is activated, hedge clippings cut by blade assembly 5 are drawn through longitudinal opening 4 by vacuum apparatus 3, and are sucked into and through air outlet 3C into collection bag 3D.

While preferred embodiments of the invention have been shown for purposes of illustration, it will be apparent to those skilled in the art that various modifications can be made falling within the spirit of the invention and the true scope of the appended claims.

What is claimed is:

1. A combined trimmer and vacuum apparatus for simultaneously clipping and vacuuming hedge debris, comprising:
   a hedge trimmer, said hedge trimmer having a base with an elongated sickle blade assembly extending therefrom;
   a vacuum apparatus, said vacuum apparatus having a housing and air inlet;
   an elongate housing, said elongate housing having a first end and an opposed second end, said first end being sealed, said second end defining a second elongate housing end opening, said second end opening being secured to said vacuum apparatus at said air inlet,
   said elongate housing further including a longitudinal opening, said longitudinal opening defining a clippings inlet portion of said housing,
   said housing further including attachment means, said attachment means securing said hedge trimmer base to said elongate housing such that said clippings inlet portion is parallel to and substantially coextensive with said elongated sickle blade assembly extending from said hedge trimmer base.

2. A combined trimmer and vacuum apparatus according to claim 1 wherein said elongate housing is tubular.

3. A combined trimmer and vacuum apparatus according to claim 1 further including handle means attached to said elongate housing, whereby said handle means are used to carry said combined trimmer and vacuum apparatus.

4. A combined trimmer and vacuum apparatus according to claim 1 further including spacer means, said spacer means extending from said elongate housing to the sickle blade assembly.

5. A combined trimmer and vacuum apparatus according to claim 4 wherein said spacer means extend from a position adjacent to said clippings inlet portion of said elongate housing to a position center of said sickle blade assembly.

6. A combined trimmer and vacuum apparatus according to claim 1 wherein the width of said clippings inlet portion extends approximately the width of said sickle blade assembly.

7. A clippings catcher for connection to a hedge trimmer and vacuum apparatus to produce a combined trimmer and vacuum apparatus for simultaneous clipping and vacuuming of hedge debris, the hedge trimmer of the type including a base with an elongated sickle blade assembly extending therefrom, the vacuum apparatus of the type having a housing and air inlet, said catcher comprising:
   an elongate housing,
   said elongate housing having a first end and an opposed second end, said first end being sealed, said second end defining a second housing end opening,
   said housing further including a longitudinal opening, said longitudinal opening defining a clippings inlet portion of said housing and,
   attachment means, said attachment means securing the hedge trimmer base to said elongate housing such that said clippings inlet portion is parallel to and substantially coextensive with the elongated sickle blade assembly extending from the hedge trimmer base.

8. A clippings catcher according to claim 7 further including handle means attached to said elongate housing, whereby said handle means are used to carry said combined trimmer and vacuum apparatus.

9. A clippings catcher according to claim 7 wherein said elongate housing is tubular.

10. A clippings catcher assembly according to claim 7 wherein said second housing end opening is secured to the vacuum apparatus at the air inlet.

11. A clippings catcher according to claim 7 further including spacer means, said spacer means extending from said elongate housing to the sickle blade assembly.

12. A clippings catcher according to claim 11 wherein said spacer means extend from a position adjacent to said clippings inlet portion of said elongate housing to a position center of said sickle blade assembly.

13. A clippings catcher according to claim 7 wherein the width of said clippings inlet portion extends approximately the width of the sickle blade assembly.

* * * * *